United States Patent
Kats et al.

(10) Patent No.: US 10,637,664 B2
(45) Date of Patent: Apr. 28, 2020

(54) USER-DIRECTED IDENTITY VERIFICATION OVER A NETWORK

(71) Applicant: SYMANTEC CORPORATION, Mountain View, CA (US)

(72) Inventors: Daniel Kats, Culver City, CA (US); Petros Efstathopoulos, Los Angeles, CA (US)

(73) Assignee: NortonLifeLock Inc., Tempe, AZ (US)

( * ) Notice: Subject to any disclaimer, the term of this patent is extended or adjusted under 35 U.S.C. 154(b) by 154 days.

(21) Appl. No.: 15/650,076

(22) Filed: Jul. 14, 2017

(65) Prior Publication Data
US 2019/0020476 A1    Jan. 17, 2019

(51) Int. Cl.
| G06F 21/00 | (2013.01) |
| H04L 9/32 | (2006.01) |
| G06F 21/40 | (2013.01) |
| G06F 21/31 | (2013.01) |
| H04L 29/06 | (2006.01) |
| G06Q 20/40 | (2012.01) |
| G06Q 20/42 | (2012.01) |

(52) U.S. Cl.
CPC ............ *H04L 9/32* (2013.01); *G06F 21/31* (2013.01); *G06F 21/40* (2013.01); *G06Q 20/4014* (2013.01); *G06Q 20/42* (2013.01); *H04L 9/321* (2013.01); *H04L 9/3226* (2013.01); *H04L 63/08* (2013.01); *H04L 63/0853* (2013.01)

(58) Field of Classification Search
CPC .................................... H04L 9/32; G06F 21/31
USPC ......................................................... 726/28
See application file for complete search history.

(56) References Cited

U.S. PATENT DOCUMENTS

| 9,438,619 | B1* | 9/2016 | Chan ................. G06F 16/24578 |
| 2010/0274597 | A1 | 10/2010 | Dill | |
| 2015/0012530 | A1* | 1/2015 | Whitehead ............. G06Q 10/10 707/732 |
| 2015/0269701 | A1 | 9/2015 | Malhotra et al. | |

(Continued)

OTHER PUBLICATIONS

MIT Technology Review, webpage, "DeepMind's New Blockchain-Sytle System Will Track Health-Care Records", https://www.technologyreview.com/s/603828/deepminds-new-blockchain-style-system-will-track-health-care-records/.

(Continued)

*Primary Examiner* — Anthony D Brown
(74) *Attorney, Agent, or Firm* — Maschoff Brennan

(57) ABSTRACT

User-directed identity verification over a network. In one embodiment, a method may include receiving identity information of a user, storing the identity information, calculating a confidence score for the identity information that indicates a level of confidence that the identity information belongs to the user, receiving a request for the identity information of the user, or for confirmation of possession of the identity information of the user, to be sent to an organization, sending an authorization request for the user to authorize the organization to access the identity information or to receive the confirmation of possession of the identity information, receiving a grant of authorization for the organization to access the identity information or to receive the confirmation of possession of the identity information, sending the identity information, or the confirmation of possession of the identity information, and the confidence score for the identity information.

20 Claims, 4 Drawing Sheets

(56) References Cited

U.S. PATENT DOCUMENTS

2016/0164885 A1  6/2016  Kirkham et al.

OTHER PUBLICATIONS

Tech Crunch Network, webpage, "IBM unveils Blockchain as a Service based on open source Hyoerledger Fabric technology", https://techcrunch.com/2017/03/19/ibm-unveils-blockchain-as-a-service-based-on-open-source-hyperledger-fabric-technology/.

Secure Key, webpage, "An Ecosystem Approach to Frictionless Digital Identiy", http://securekey.com/digital-id-ecosystem/.

IDology, webpage, "ID Verification", https://www.idology.com/id-verification/id-verification/.

Experian, webpage, "Fraud Detection and Prevention Solutions", http://www.experian.com/decision-analytics/identity-and-fraud/fraud-detection-and-prevention.html.

Blockscore, webpage, "Intelligent ID verification", https://blockscore.com/features/identity-verification.

United States Patent and Trademark Office; International Search Report and Written Opinion; issued in PCT Application No. PCT/US18/41276; 8 pages.

* cited by examiner

USER-DIRECTED IDENTITY VERIFICATION OVER A NETWORK

BACKGROUND

There are many situations in which an organization may desire to verify the identity of an individual. However, there is often a fundamental conflict between an organization wanting to verify the identity of an individual and that individual's desire for privacy.

For example, an organization operating an email website may want to verify that a new user trying to create an email account on the email website is who they say they are. One common process for accomplishing user verification on an email website involves requiring the user to provide both an email and a mobile phone number. However, this common process can be problematic because requiring the user (who is trying to set up a new email account) to already have an email account may create a circular dependency, and because a privacy-conscious user may object to disclosing their mobile phone number since the potential for abuse inherent in such a disclosure may be higher than the benefit of obtaining an email account with the email website. If the email website fails to employ this common process, however, the email website may be plagued with accounts created by illegitimate users such as fake users or even bots.

In another example, a financial organization such as a bank may want to verify that a new user trying to open a financial account through their banking website is who they say they are and resides where they say they reside. One common process for accomplishing user verification on a banking website involves requiring the user to provide multiple pieces of identification to confirm the user's identity and address, as well as requiring the user to fill out a host of forms requesting personal information. However, this common process can be problematic because it can be cumbersome for the user to find and provide the required identification, and because a privacy-conscious user may object to disclosing sensitive identification and personal information to a bank with whom the user has not previously done business.

In yet another example, a communications organization such as a telecom provider may want to verify that a new user trying to obtain a pay-as-you-go mobile phone account through their kiosk at an airport is who they say they are. One common process for accomplishing user verification at a kiosk involves requiring the user to provide multiple pieces of identification to confirm the user's identity. However, this common process can be problematic because it can be cumbersome for the user, who may be traveling, to find and provide the required identification, and because a privacy-conscious user may object to disclosing sensitive identification and personal information to the telecom organization in a foreign country.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for user-directed identity verification over a network may be performed, at least in part, by a computing device including at least one processor. The method may include receiving, over a network and from a first network device, identity information of a user, storing the identity information, and calculating a confidence score for the identity information that indicates a level of confidence that the identity information belongs to the user. The method may also include receiving, over the network and from a second network device, a request for the identity information of the user, or for confirmation of possession of the identity information of the user, to be sent to an organization. The method may further include sending, over the network and to the first network device, an authorization request for the user to authorize the organization to access the identity information or to receive the confirmation of possession of the identity information. The method may also include receiving, over the network and from the first network device, a grant of authorization for the organization to access the identity information or to receive the confirmation of possession of the identity information. The method may further include sending, over the network and to the second network device, the identity information, or the confirmation of possession of the identity information, and the confidence score for the identity information.

In some embodiments, the identity information of the user may include a copy of a government-issued identity document of the user such as a birth certificate, a social security card, a driver's license, an identification card, or a passport. In some embodiments, the storing of the government-issued identity document may include processing the copy of the government-issued identity document to confirm validity of the government-issued identity document and/or extracting personal information of the user from the government-issued identity document and storing the extracted personal information. In some embodiments, the identity information of the user may include personal information of the user such as a birth date, a social security number, a driver's license number, an identification card number, a passport number, a phone number, a home address, an email address, a financial account number, a personal identification number (PIN), or a password.

Also, in some embodiments, the confidence score for the identity information may be between 0% and 100% that the identity information belongs to the user. In some embodiments, the receiving of the grant of authorization may include receiving a default grant of authorization due to the organization being preauthorized by the user to receive the grant of authorization for the organization to access the identity information or to receive the confirmation of possession of the identity information.

Further, in some embodiments, one or more non-transitory computer-readable media may include one or more computer-readable instructions that, when executed by one or more processors, cause the one or more processors to perform a method for user-directed identity verification over a network.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
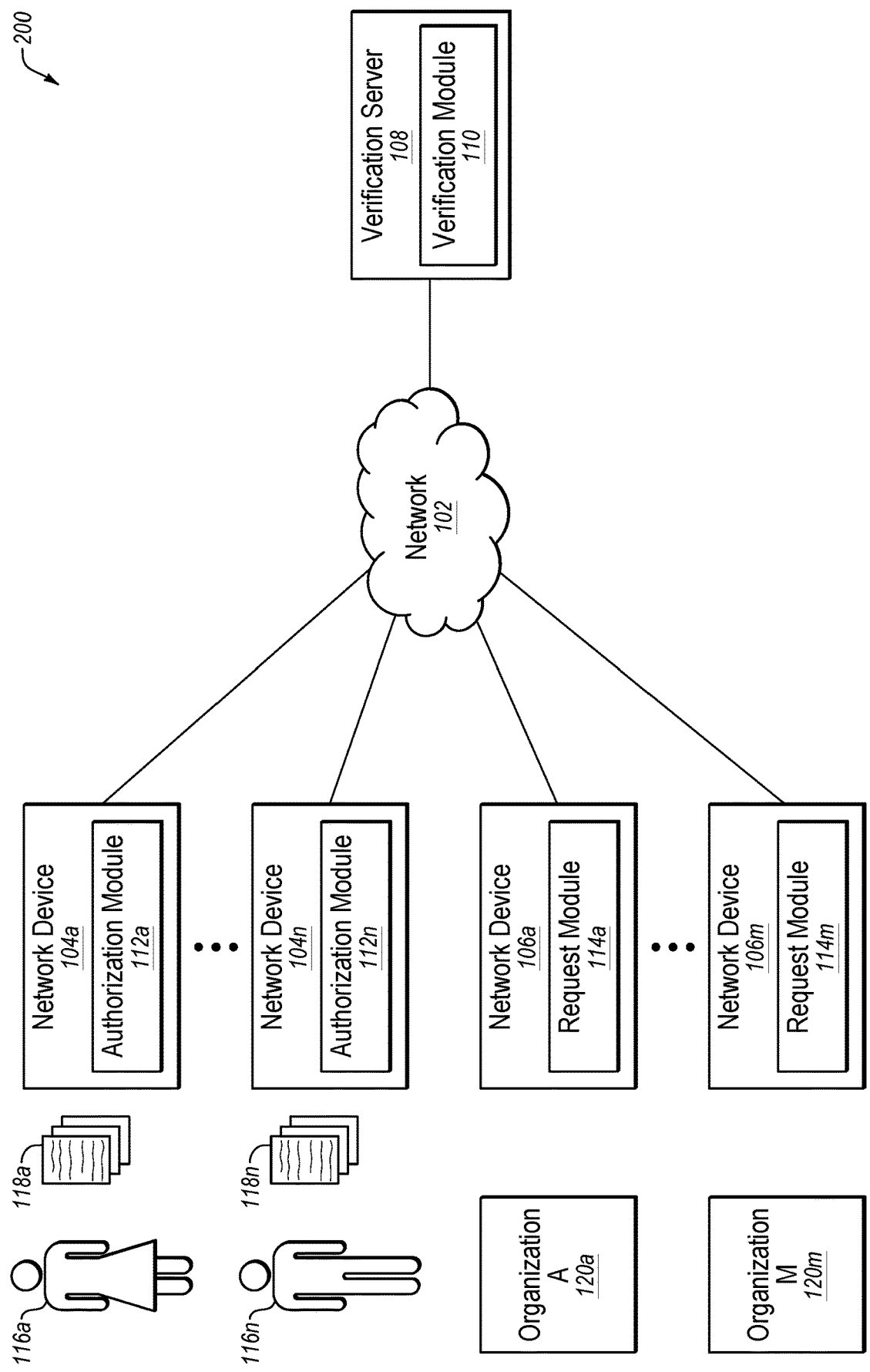
FIG. 1 illustrates an example system configured for user-directed identity verification over a network.

Some embodiments in this disclosure relate to user-directed identity verification over a network.

There is often a fundamental conflict between an organization wanting to verify the identity of an individual and that individual's desire for privacy. For example, where an organization's process for verifying that a user is who they say they are includes requiring the user to provide identity information, such as government-issued identity documents and personal information, it can be cumbersome for the user to find and provide the required government-issued identity documents and personal information and privacy-conscious users may object to disclosing these documents and information since the potential for abuse inherent in such a disclosure may be higher than the benefit of obtaining the services of the organization. However, if the organization fails to employ a process for verifying a user's identity, the organization runs the risks inherent with dealing with users who are not who they say they are, such as all the risks associated with stolen identities and fake identities.

The embodiments disclosed herein may enable user-directed identity verification over a network. In some embodiments, user-directed identity verification over a network may include employing a verification server. A user may send identity information, such as copies of government-issued identity documents and personal information, to the verification server where the identity information may be analyzed and stored. Then, the verification server may calculate a confidence score for the identity information that indicates a level of confidence that the identity information belongs to the user. Later, a network device of an organization may send a request to the verification server to access the identity information, or to receive confirmation that the identity information is in the possession of the verification server. The verification server may then communicate with a network device of the user over the network to notify the user of the request by the organization and to allow the user to direct how much access, if any, the organization should be granted to the user information. For example, a user may grant access to one type of government-issued identity document (such as a driver's license) while denying access to another type of government-issued identity document (such as a social security card or a passport). Then the verification server may grant access to, or confirm possession of, the identity information to the network device of the organization only to the extent allowed by the user. In this manner, a network-based user-verification process may be directed by the user.

Since users are able to control the level of access that the verification server grants to the network device of any given organization for any given identity information, users may be willing to provide higher quality identity information, and a higher quantity of identity information, than where users are not able to control access to their identity information. Further, where an organization only needs confirmation that the verification server possesses identity information, the organization may receive this confirmation while avoiding the liability of storing the identity information.

Turning to the figures, FIG. 1 illustrates an example system 100 configured for user-directed identity verification over a network. The system 100 may include a network 102, network devices 104a-104n, network devices 106a-106m, and a verification server 108.

In some embodiments, the network 102 may be configured for to communicatively couple the network devices 104a-104n and 106a-106m to one another as well as to the verification server 108. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 3:
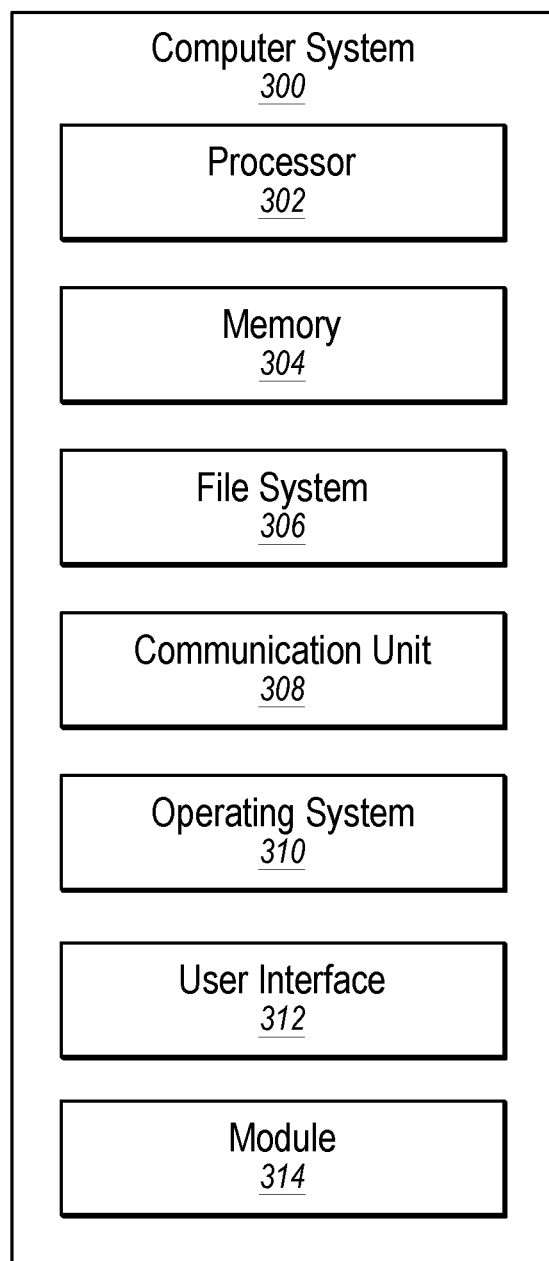
FIG. 3 illustrates an example computer system that may be employed in user-directed identity verification over a network.

In some embodiments, each of the network devices 104a-104n and 106a-106m may be any computer system capable of communicating over the network 102, examples of which are disclosed herein in connection with the computer system 300 of FIG. 3. In some embodiments, the network devices 104a-104n may be associated with users 116a-116n, respectively, and may include authorization modules 112a-112n, respectively. Similarly, in some embodiments, the network devices 106a-106m may be associated with organizations 120a-120m, respectively, and may include request modules 114a-114m, respectively.

In some embodiments, the verification server 108 may be any computer system capable of communicating over the network 102 with the network devices 104a-104n and 106a-106m, examples of which are disclosed herein in connection with the computer system 300 of FIG. 3. In some embodiments, the verification server 108 may be operated by a third-party identity verification organization and/or identity theft protection organization, such as LifeLock®, in order to offer third-party identity verification services. These third-party identity verification services may be offered to the organizations 120a-120m to assist the organizations 120a-120m in verifying that any of the users 116a-116n is who they say they are. In some embodiments, the verification server 108 may include a verification module 110 that may be configured, along with the authorization modules 112a-112n and the request modules 114a-114m, for user-directed identity verification over the network 102.

For example, the users 116a-116n may employ the authorization modules 112a-112n, respectively, to send identity information 118a-118n, respectively, over the network 102 to the verification module 110. The verification module 110 may then analyze and store the identity information 118a-118n. The verification module 110 may then calculate a confidence score for each piece of the identity information 118a-118n that indicates a level of confidence that the identity information belongs to the corresponding one of the users 116a-116n.

Later, the organization 120a may employ the request module 114a to send a request over the network 102 to the verification module 110 to access information related to the identity information 118a of the user 116a stored by the verification module 110, such as the identity information 118a itself or confirmation that the identity information 118a is in the possession of the verification module 110. The verification module 110 may then communicate with the authorization module 112a over the network 102 to notify the user 116a of the request by the organization 120a and to allow the user 116a to direct how much access the organization 120a should be granted to the requested information, if any. Then the verification module 110 may grant access to the organization 120a to the requested information only to the extent allowed by the user 116a. In this manner, a network-based user-verification process may be directed by the user 116a.

For example, where the organization 120a is an email provider, and the network device 106a is a webserver hosting an email website of the email provider, the email website may request confirmation of possession of a mobile phone number of the user 116a in order to verify the identity of the user 116a prior to allowing the user 116a to open a new email account on the email website. The user 116a may grant or deny access to the email website to confirmation of possession of her mobile phone number. Where granted, the email website may receive from the verification server 108 confirmation that a mobile phone number for the user 116a is in the possession of the verification server 108, along with a confirmation score that indicates a level of confidence that the mobile phone number belongs to the user 116a.

In another example, where the organization 120a is a bank, and the network device 106a is a webserver hosting a banking website of the bank, the banking website may request the user's address and two government-issued identity documents that confirm the user's address in order to verify the identity of the user 116a, and in order to confirm that the user 116a resides within the geographic boundaries that the bank services, prior to allowing the user 116a to open a new bank account on the banking website. The user 116a may grant or deny access to the banking website to her address and to her passport and her driver's license. Where granted, the banking website may receive from the verification server 108 the address of the user 116a as well copies of her passport and driver's license, along with confirmation scores that indicate levels of confidence that each of the address, the passport, and the driver's license belongs to the user 116a.

In yet another example, where the organization 120a is a telecom provider, and the network device 106a is a kiosk in an airport hosting a pay-as-you-go mobile phone signup application of the telecom provider, the kiosk may request a bank account number and confirmation of possession of the driver's license of the user 116a in order to verify the identity of the user 116a prior to allowing the user to open a new pay-as-you-go mobile phone account on the kiosk. The user 116a may grant or deny access to the kiosk to each of her bank account number and driver's license. Where granted, the telecom provider may receive from the verification server 108 the bank account number of the user 116a as well as confirmation that her driver's license is in the possession of the verification server 108, along with confirmation scores that indicate levels of confidence that each of the bank account number and the driver's license belongs to the user 116a.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2A:
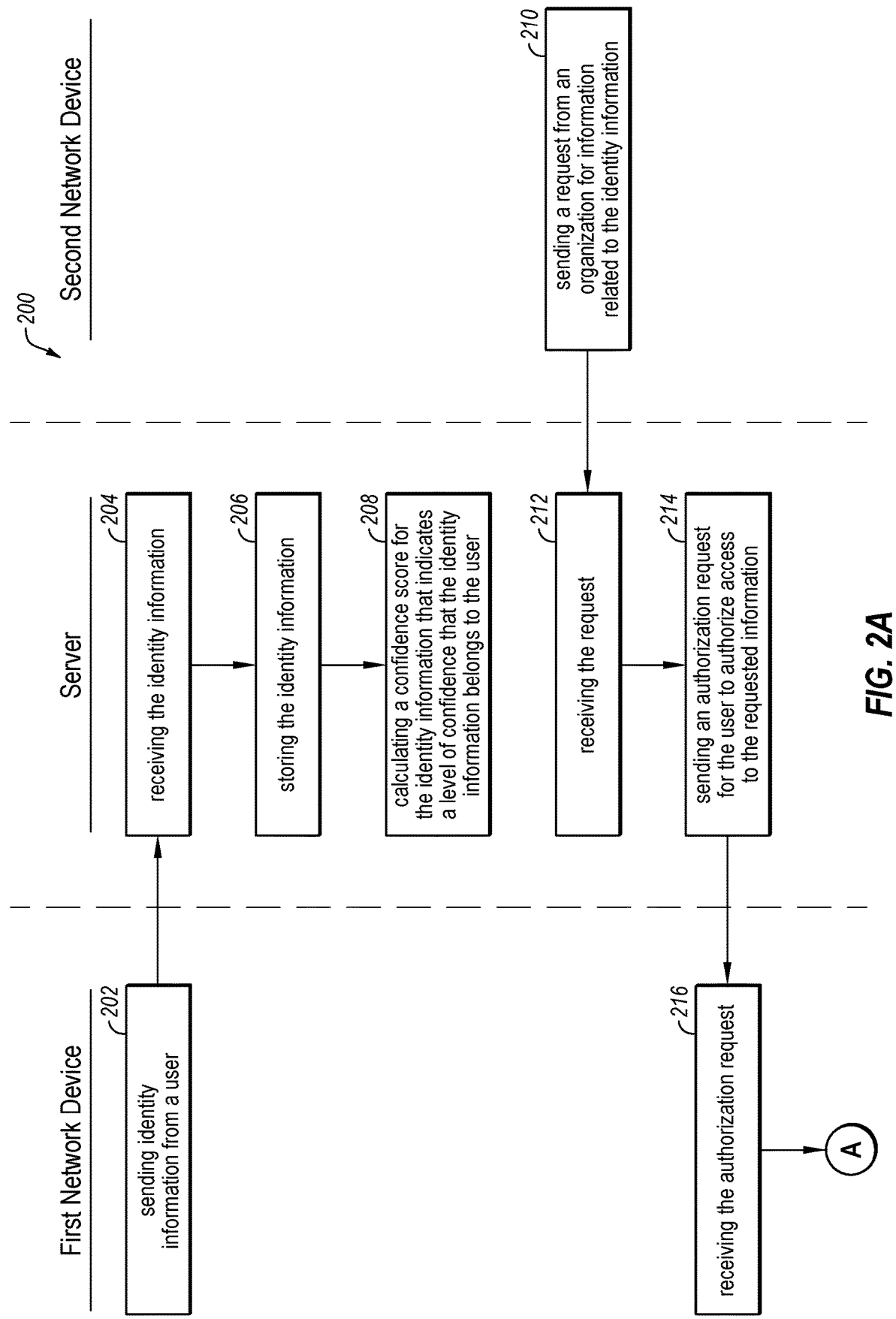
FIGS. 2A-2B are a flowchart of an example method for user-directed identity verification over a network.
Figure 2B:
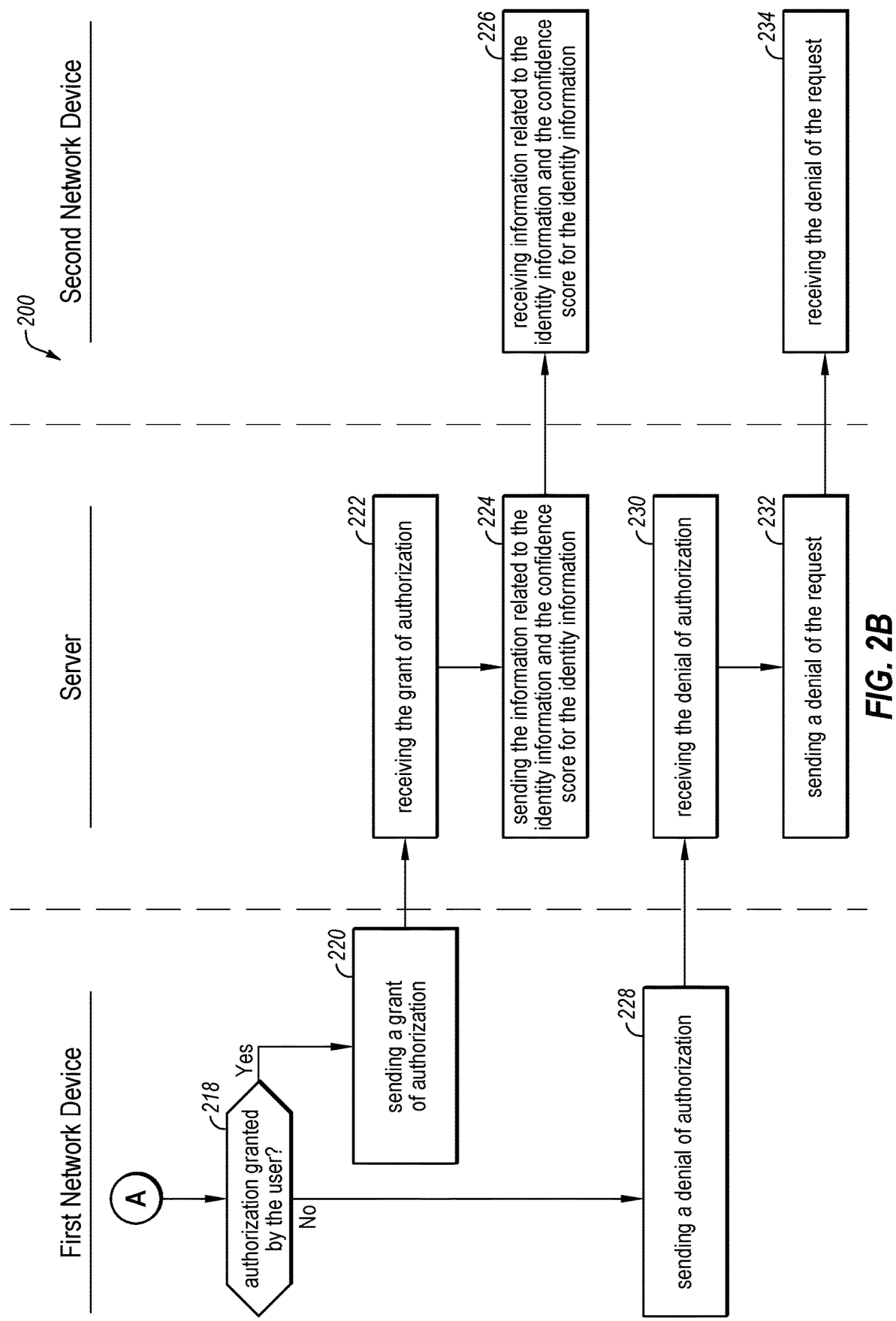

FIGS. 2A-2B are a flowchart of an example method 200 for user-directed identity verification over a network. The method 200 may be performed, in some embodiments, by one or more devices or systems, such as by the authorization module 112a executing on the network device 104a, the request module 114a executing on the network device 106a, and the verification module 110 executing on the verification server 108 of FIG. 1. In these and other embodiments, the method 200 may be performed by one or more processors based on one or more computer-readable instructions stored on one or more non-transitory computer-readable media. The method 200 will now be described in connection with FIGS. 1 and 2A-2B.

The method 200 may include, at block 202, a first network device sending, over a network, identity information from a user and, at block 204, a server receiving the identity information. In some embodiments, the identity information of the user may include a copy of a government-issued identity document of the user such as a birth certificate, a social security card, a driver's license, an identification card, or a passport. In some embodiments, the identity information of the user may include personal information of the user such as a birth date, a social security number, a driver's license number, an identification card number, a passport number, a phone number, a home address, an email address, a financial account number, a personal identification number (PIN), or a password. For example, the authorization module 112a may send, at block 202, the identity information 118a from the user 116a and the verification module 110 may receive, at block 204, the identity information 118a.

The method 200 may include, at block 206, the server storing the identity information. In some embodiments, where the identity information includes a copy of a government-issued identity document, the storing of the copy of the government-issued identity document may include one or more of processing the copy of the government-issued identity document to confirm validity of the government-issued identity document and/or extracting personal information of the user from the government-issued identity document, such as using optical character recognition (OCR) techniques, image recognition techniques, and/or other digital parsing, and storing the extracted personal information. In some embodiments, the storing of the identity information may include securely storing the identity information such as by securely storing the identity information in an encrypted format. The level of securely storing identity information may depend on a classification of the identity information as requiring low security, medium security, or high security (e.g., a library card may require low security, a social security card may require medium security, and a passport may require high security). For example, the verification module 110 may store, at block 206, the identity information 118a. Where the identity information 118a is a government-issued identity document, such as a passport, the verification module 110 may further process, at block 206, the passport to confirm validity of the passport and/or extract personal information of the user from the passport (such as a birth date, a passport number, and a home address of the user 116a) and store the extracted personal information.

The method 200 may include, at block 208, the server calculating a confidence score for the identity information that indicates a level of confidence that the identity information belongs to the user. In some embodiments, the confidence score for the identity information may be between 0% and 100% that the identity information belongs to the user. In some embodiments, the calculation of the confidence score at block 208 may include an analysis of all pieces of identity information received from the user to determine if a particular piece of identity information belongs to a user. For example, the verification module 110 may calculate, at block 208, a confidence score for the identity information 118a that indicates a level of confidence that the identity information 118a belongs to the user 116a. For instance, where the identity information 118a is a copy of a passport, the verification module 110 may calculate, at block 208, that there is a 98% level of confidence that the passport belongs to the user 116a, based on image recognition of key security components of the passport, based on the picture on the passport matching another verified picture of the user 116a, based on a comparison of the passport and other verified identity document(s) of the user 116a, based on the personal information extracted from the passport matching other verified personal information of the user 116a, and/or other factors.

The method 200 may include, at block 210, a second network device sending, over the network, a request from an organization for information related to the identity information and, at block 212, the server receiving the request. In some embodiments, the information related to the identity information may be the identity information itself. In some embodiments, the information related to the identity information may be confirmation of possession of the identity information. A confirmation of possession may be associated with a secure token that may be capable of being sent to a network device of an organization. For example, the request module 114a may send, at block 210, a request from the organization 120a for information related to the identity information 118a of the user 116a (such as a request for the identity information 118a itself or for confirmation of possession of the identity information 118a) and the verification module 110 may receive, at block 212, the request.

The method 200 may include, at block 214, the server sending an authorization request for the user to authorize access to the requested information and, at block 216, the first network device receiving the authorization request. In some embodiments, the authorization request may be in the form of a push notification to the first network device. For example, the verification module 110 may send, at block 214, an authorization request for the user 116a to authorize the organization 120a to access the information that was requested at block 210 and the authorization module 112a may receive, at block 216, the authorization request.

The method 200 may include, at decision block 218, the first network device determining whether the authorization is granted by the user. If so (Yes at decision block 218), the method may include blocks 220-226. If not (No at decision block 218), the method may include blocks 228-234. Where access to multiple pieces of information is requested of the user, the user may be able to grant access to the multiple pieces of information using a single action, such as a single click of a button on a user interface. For example, the authorization module 112a may determine, at decision block 218, whether the authorization received at block 216 is granted by the user 116a. If so, the method may proceed to blocks 220-226 and, if not, the method may proceed to blocks 228-234.

The method 200 may include, at block 220, the first network device sending a grant of authorization and, at block 222, the server receiving the grant of authorization. In some embodiments, the grant of authorization may include a default grant of authorization due to one or more of: the organization requesting information at block 210 being preauthorized by the user, the organization requesting information at block 210 being of a type that is preauthorized by the user, the information requested at block 210 being preauthorized by the user, and the information requested at block 210 being of a type that is preauthorized by the user. For example, the authorization module 112a may send, at block 220, a grant of authorization for the organization 120a to access the information that was requested at block 210 and the verification module 110 may receive, at block 222, the grant of authorization. The authorization module 112a may automatically send, at block 220, a default grant of authorization due to the information that was requested at block 210 being preauthorized by the user 116a, or due to the information that was requested at block 210 being of a type of information that was preauthorized by the user 116a. For instance, the user 116a may preauthorize confirmation possession of all government-issued identity documents. Therefore, if the information that was requested at block 210 was confirmation of possession of the passport of the user 116a, then the authorization module 112a may automatically send, at block 220, a default grant of authorization due to confirmation of possession of the passport being of the type of information that is preauthorized by the user 116a. Similarly, the user 116a may preauthorize unlimited access by governmental organizations to her identity information 118a. Therefore, if the request at block 210 was from the U.S. State Department, then the authorization module 112a may automatically send, at block 220, a default grant of authorization due to the U.S. State Department being of the type of organization that is preauthorized by the user 116a.

The method 200 may include, at block 224, the server sending the information related to the identity information and the confidence score for the identity information and, at block 226, the second network device receiving the information related to identity information and the confidence score for the identity information. For example, the verification module 110 executing on the verification server 108 may send, at block 224, the information related to the identity information 118a of the user 116a (such as the identity information 118a itself or confirmation of possession of the identity information 118a) and the confidence score for the identity information 118a and the request module 114a executing on the network device 106a may receive, at block 226, the information related to the identity information 118a of the user 116a and the confidence score for the identity information 118a. The organization 120a may then use the information received, along with the confidence score, in order to verify that the user 116a is who she says she is.

The method 200 may include, at block 228, the first network device sending a denial of authorization and, at block 230, the server receiving the denial of authorization. For example, the authorization module 112a executing on the network device 104a may send, at block 228, a denial of authorization for the organization 120a to access the information that was requested at block 210 and the verification module 110 executing on the verification server 108 may receive, at block 230, the denial of authorization.

The method 200 may include, at block 232, the server sending a denial of the request and, at block 234, the second network device receiving the denial of the request. For example, the verification module 110 executing on the verification server 108 may send, at block 232, a denial of the request that was sent at block 210 and the request module 114a executing on the network device 106a may receive, at block 234, the denial of the request. The organization 120a may then use this denial of its request in deciding whether or not to verify that the user 116a is who she says she is.

In some embodiments, the method 200 may enable user-directed identity verification over a network. Since users are able to control the level of access that the verification server grants to any given organization for any given identity information, users may be willing to provide higher quality identity information, and a higher quantity of identity information, in the method 200 than in other methods where users are not able to control access to their identity information. Further, where an organization only needs confirmation that the verification server possesses identity information, the method 200 may enable the organization to receive this confirmation while avoiding the liability of storing the identity information.

Although the blocks of the method 200 are illustrated in FIGS. 2A-2B as discrete blocks, various blocks may be divided into additional blocks, combined into fewer blocks, reordered, expanded, or eliminated, depending on the desired implementation. For example, in some embodiments, blocks 202-208 may be performed without performing blocks 210-234. Further, in some embodiments, blocks 202-208 may be performed in parallel with the performance of one or more of blocks 210-234. Further, the method 200 may include one or more additional blocks in which the server tracks and maintains a list of what organizations have been granted access to what information and then allows the user to access this list. Also, the method 200 may include one or more additional blocks in which the server automatically notifies organizations that have been granted access to information when there is any update to that information.

Further, it is understood that the method 200 may improve the functioning of a network environment. For example, the functioning of the verification server 108 or any of the network devices 104a-104n and 106a-106m of FIG. 1 may itself be improved by the method 200 as any of these computer systems may be improved by enabling automatic notification to, and direction from, a user as to the level of access to the user's identity information that the user wishes to grant to an organization. Instead of leaving the user out of the identity verification process, as is the case in conventional network-based identity verification methods, the method 200 involves the user so that the user retains control over the level of access that a verification server grants to any given organization for any given identity information.

Also, the method 200 may improve the technical field of network-based identity verification. Enabling a user to direct the level of access to the user's own identity information enables the network-based identity verification of the method 200 to likely include higher quality identity information, and a higher quantity of identity information, than where users are not able to control access to their identity information. The method 200 may also avoid liability for organizations in network-based identity verification systems, which are subject to the constant threat of being hacked, by avoiding the storing of the identity information and instead only receiving confirmation of possession of the identity information by a third-party verification server.

FIG. 3 illustrates an example computer system 300 that may be employed in user-directed identity verification over a network. In some embodiments, the computer system 300 may be part of any of the systems or devices described in this disclosure. For example, the computer system 300 may be part of any of the network devices or the verification server of FIG. 1.

The computer system 300 may include a processor 302, a memory 304, a file system 306, a communication unit 308, an operating system 310, a user interface 312, and a module 314, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more blocks of the method 200 of FIGS. 2A-2B.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more blocks of the method 200 of FIGS. 2A-2B. These computer-executable instructions may be included, for example, in the operating system 310, in one or more applications, such as the module 314, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The module 314 may be one or more computer-readable instructions stored on one or more non-transitory computer-readable media, such as the memory 304 or the file system 306, that, when executed by the processor 302, is configured to perform one or more blocks of the method 200 of FIGS. 2A-2B. In some embodiments, the module 314 may be part of the operating system 310 or may be part of an application of the computer system 300, or may be some combination thereof. In some embodiments, the module 314 may function as any of the authorization modules 112a-112n, the request modules 114a-114m, and the verification module 110 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software modules, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments.

However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for user-directed identity verification over a network, at least a portion of the method being performed by a computing device comprising at least one processor, the method comprising:

receiving, over a network and from a first network device, identity information of a user;

storing the identity information;

calculating a confidence score for the identity information that indicates a level of confidence that the identity information belongs to the user;

receiving, over the network and from a second network device, a request for the identity information of the user to be sent to an organization;

sending, over the network and to the first network device, an authorization request for the user to authorize the organization to access the identity information;

receiving, over the network and from the first network device, a grant of authorization for the organization to access the identity information; and sending, over the network and to the second network device, the identity information and the confidence score for the identity information.

2. The method of claim 1, wherein the identity information of the user comprises a copy of a government-issued identity document of the user.

3. The method of claim 2, wherein the storing of the government-issued identity document further comprises processing the government-issued identity document to confirm validity of the government-issued identity document.

4. The method of claim 2, wherein the storing of the government-issued identity document further comprises extracting personal information of the user from the government-issued identity document and storing the extracted personal information.

5. The method of claim 1, wherein the identity information of the user comprises personal information of the user.

6. The method of claim 1, wherein the confidence score for the identity information is expressed as a percentage between 0% and 100% that the identity information belongs to the user.

7. The method of claim 1, wherein the receiving of the grant of authorization comprises receiving a default grant of authorization due to the organization being preauthorized by the user to receive the grant of authorization for the organization to access the identity information.

8. A computer-implemented method for user-directed identity verification over a network, at least a portion of the method being performed by a computing device comprising at least one processor, the method comprising:

receiving, over a network and from a first network device, identity information of a user;

storing the identity information;

calculating a confidence score for the identity information that indicates a level of confidence that the identity information belongs to the user;

receiving, over the network and from a second network device, a request for confirmation of possession of the identity information of the user to be sent to an organization;

sending, over the network and to the first network device, an authorization request for the user to authorize the organization to receive the confirmation of possession of the identity information;

receiving, over the network and from the first network device, a grant of authorization for the organization to receive the confirmation of possession of the identity information; and sending, over the network and to the second network device, the confirmation of possession of the identity information and the confidence score for the identity information.

9. The method of claim 8, wherein the identity information of the user comprises a copy of a government-issued identity document of the user comprising one or more of a birth certificate, a social security card, a driver's license, an identification card, and a passport.

10. The method of claim 9, wherein the storing of the government-issued identity document comprises one or more of:

processing the government-issued identity document to confirm validity of the government-issued identity document; and extracting personal information of the user from the government-issued identity document and storing the extracted personal information.

11. The method of claim 8, wherein the identity information of the user comprises personal information of the user comprising one or more of a birth date, a social security number, a driver's license number, an identification card number, a passport number, a phone number, a home address, an email address, a financial account number, a personal identification number (PIN), and a password.

12. The method of claim 8, wherein the confidence score for the identity information is expressed as a percentage between 0% and 100% that the identity information belongs to the user.

13. The method of claim 8, wherein the receiving of the grant of authorization comprises receiving a default grant of authorization due to the organization being preauthorized by the user to receive the grant of authorization for the organization to receive the confirmation of possession of the identity information.

14. One or more non-transitory computer-readable media comprising one or more computer-readable instructions that, when executed by one or more processors of one or more computing devices, cause the one or more computing devices to perform a method for user-directed identity verification over a network, the method comprising:

receiving, over a network and from a first network device, identity information of a user;

storing the identity information;

calculating a confidence score for the identity information that indicates a level of confidence that the identity information belongs to the user;

receiving, over the network and from a second network device, a request for the identity information of the user, or for confirmation of possession of the identity information of the user, to be sent to an organization;

sending, over the network and to the first network device, an authorization request for the user to authorize the organization to access the identity information or to receive the confirmation of possession of the identity information;

receiving, over the network and from the first network device, a grant of authorization for the organization to access the identity information or to receive the confirmation of possession of the identity information; and sending, over the network and to the second network device, the identity information, or the confirmation of possession of the identity information, and the confidence score for the identity information.

15. The one or more non-transitory computer-readable media of claim 14, wherein the identity information of the user comprises a copy of a government-issued identity document of the user.

16. The one or more non-transitory computer-readable media of claim 15, wherein the storing of the government-issued identity document further comprises processing the government-issued identity document to confirm validity of the government-issued identity document.

17. The one or more non-transitory computer-readable media of claim 15, wherein the storing of the government-issued identity document further comprises extracting personal information of the user from the government-issued identity document and storing the extracted personal information.

18. The one or more non-transitory computer-readable media of claim 14, wherein the identity information of the user comprises personal information of the user.

19. The one or more non-transitory computer-readable media of claim 14, wherein the confidence score for the identity information is expressed as a percentage between 0% and 100% that the identity information belongs to the user.

20. The one or more non-transitory computer-readable media of claim 14, wherein the receiving of the grant of authorization comprises receiving a default grant of authorization due to the organization being preauthorized by the user to receive the grant of authorization for the organization to access the identity information or to receive the confirmation of possession of the identity information.

* * * * *